United States Patent [19]

Resler, Jr.

[11] 3,877,229
[45] Apr. 15, 1975

[54] COMBUSTION MEANS FOR A LOW-POLLUTION ENGINE
[75] Inventor: Edwin L. Resler, Jr., Ithaca, N.Y.
[73] Assignee: Cornell Research Foundation, Inc., Ithaca, N.Y.
[22] Filed: Feb. 4, 1974
[21] Appl. No.: 439,583

Related U.S. Application Data
[63] Continuation-in-part of Ser. No. 306,721, Nov. 15, 1972, abandoned.

[52] U.S. Cl. .................. 60/597; 60/616; 60/620
[51] Int. Cl. ..................... F02g 1/00; F02g 3/02
[58] Field of Search ............ 60/597, 614, 616, 620, 60/623, 643, 685, 686, 39.5, 39.51 R, 369, 371

[56] References Cited
UNITED STATES PATENTS

| | | | |
|---|---|---|---|
| 1,369,511 | 2/1921 | Wiesner | 60/620 |
| 1,380,795 | 6/1921 | Graziano | 60/325 X |
| 1,926,463 | 9/1933 | Stoddard | 60/650 X |
| 2,966,776 | 1/1961 | Taga | 60/616 |
| 3,192,705 | 7/1965 | Miller | 60/511 |
| 3,267,661 | 8/1966 | Petrie | 60/620 |

Primary Examiner—Edgar W. Geoghegan
Attorney, Agent, or Firm—Lawrence E. Laubscher

[57] ABSTRACT

Combustion means are provided for burning in a low-pollution manner the exhaust gases of an internal combustion engine operable in the fuel-rich mode. In order to effect complete combustion of the hydrocarbon and carbon monoxide components without the formation of undesirable oxides of nitrogen, the combustion of the fuel-rich exhaust gases is effected by burner means operable at one atmosphere and between about 2500° Rankine to about 3300° Rankine. Combustion air is supplied to the burner by an air motor of the piston-cylinder type which may be driven by the crankshaft of the engine. Heat exchanger means may be provided for converting the heat of the burner flame to useful mechanical energy that is returned as driving power to the engine. One or more of the cylinders of the engine may constitute the air cylinder means for supplying combustion air to the burner, as well as the means for returning power from the burner to the output shaft of the engine.

38 Claims, 16 Drawing Figures

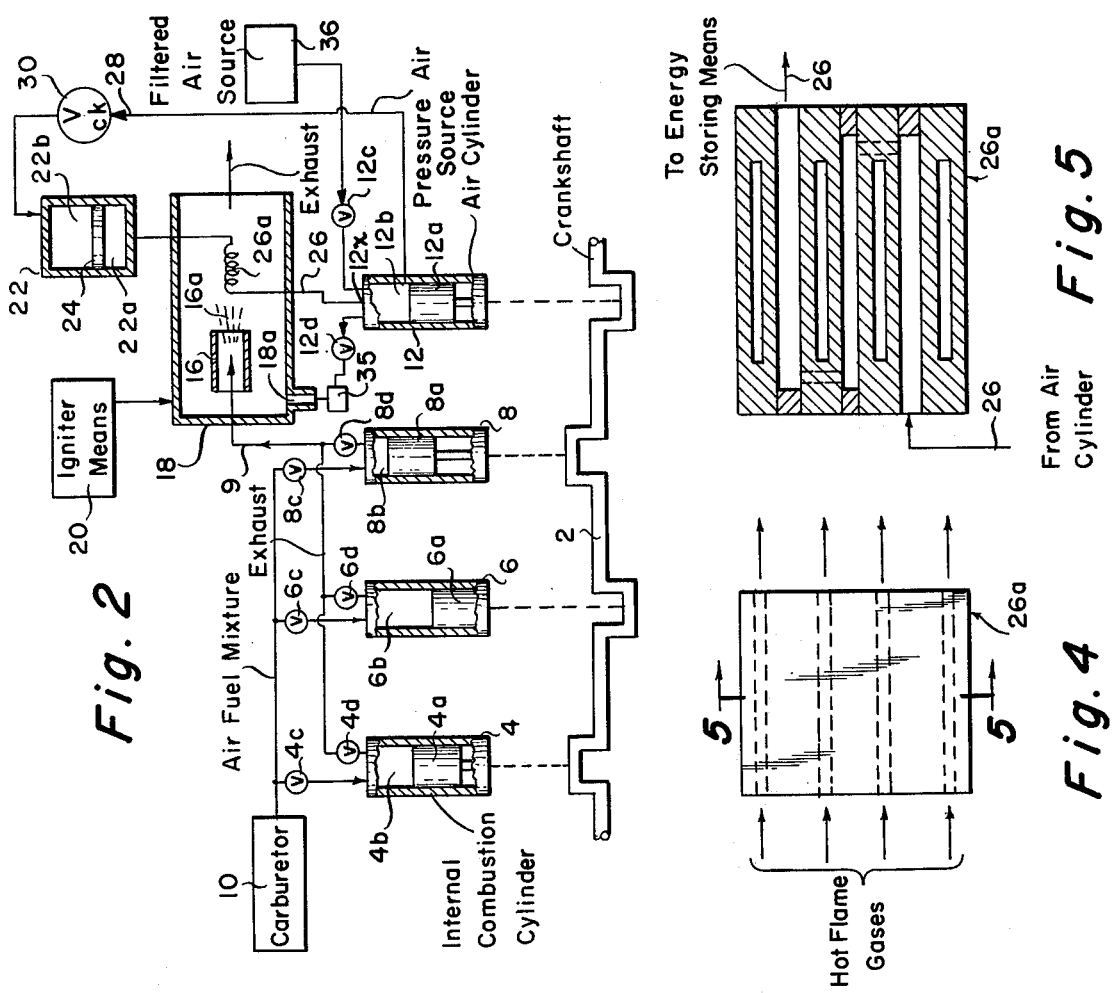
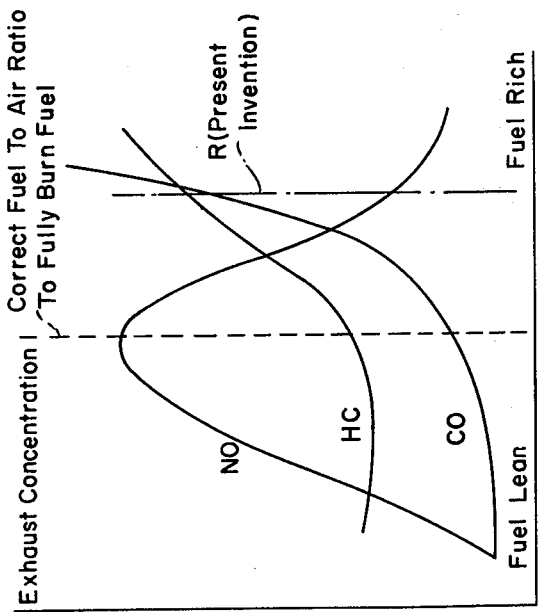

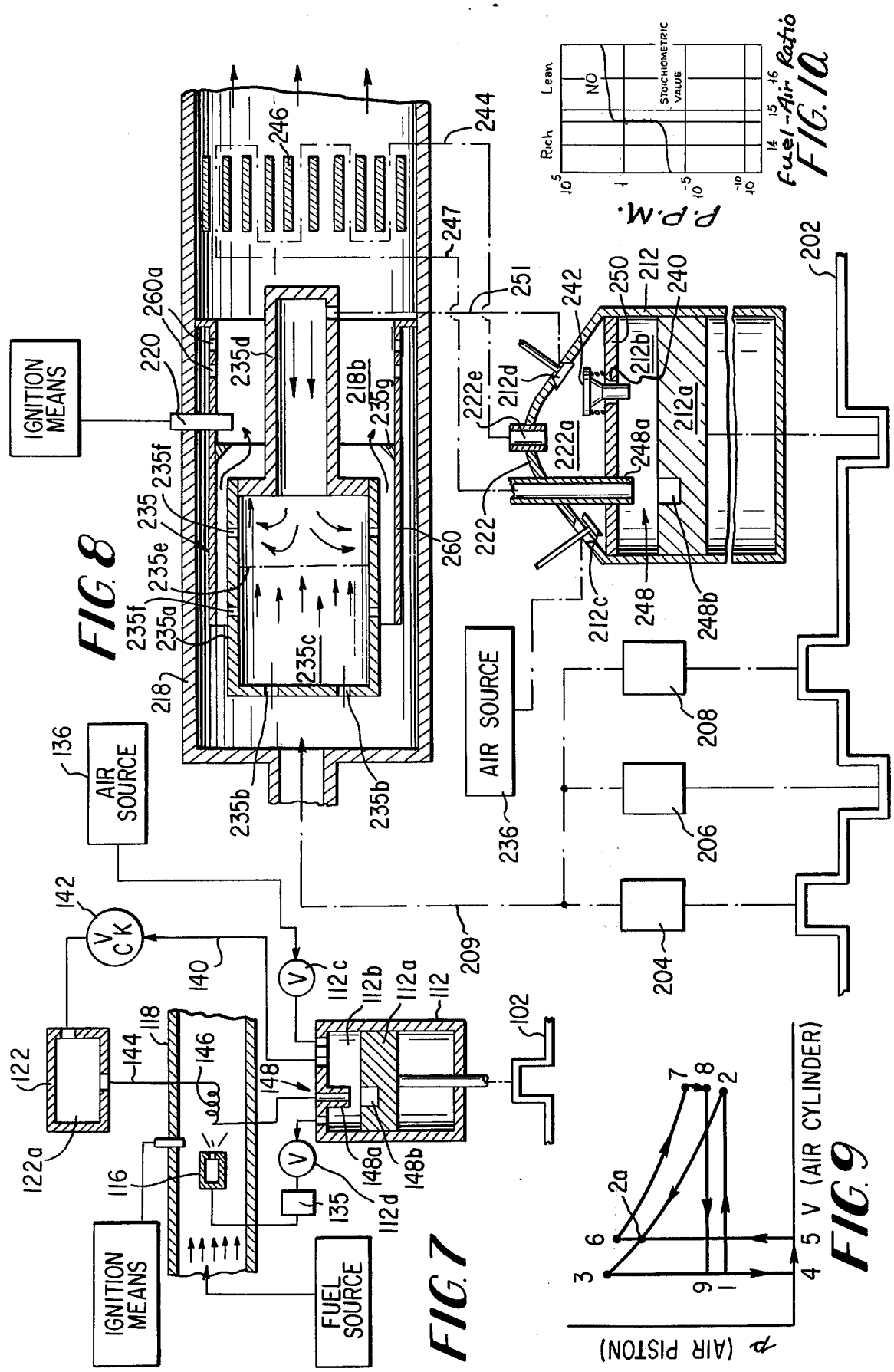

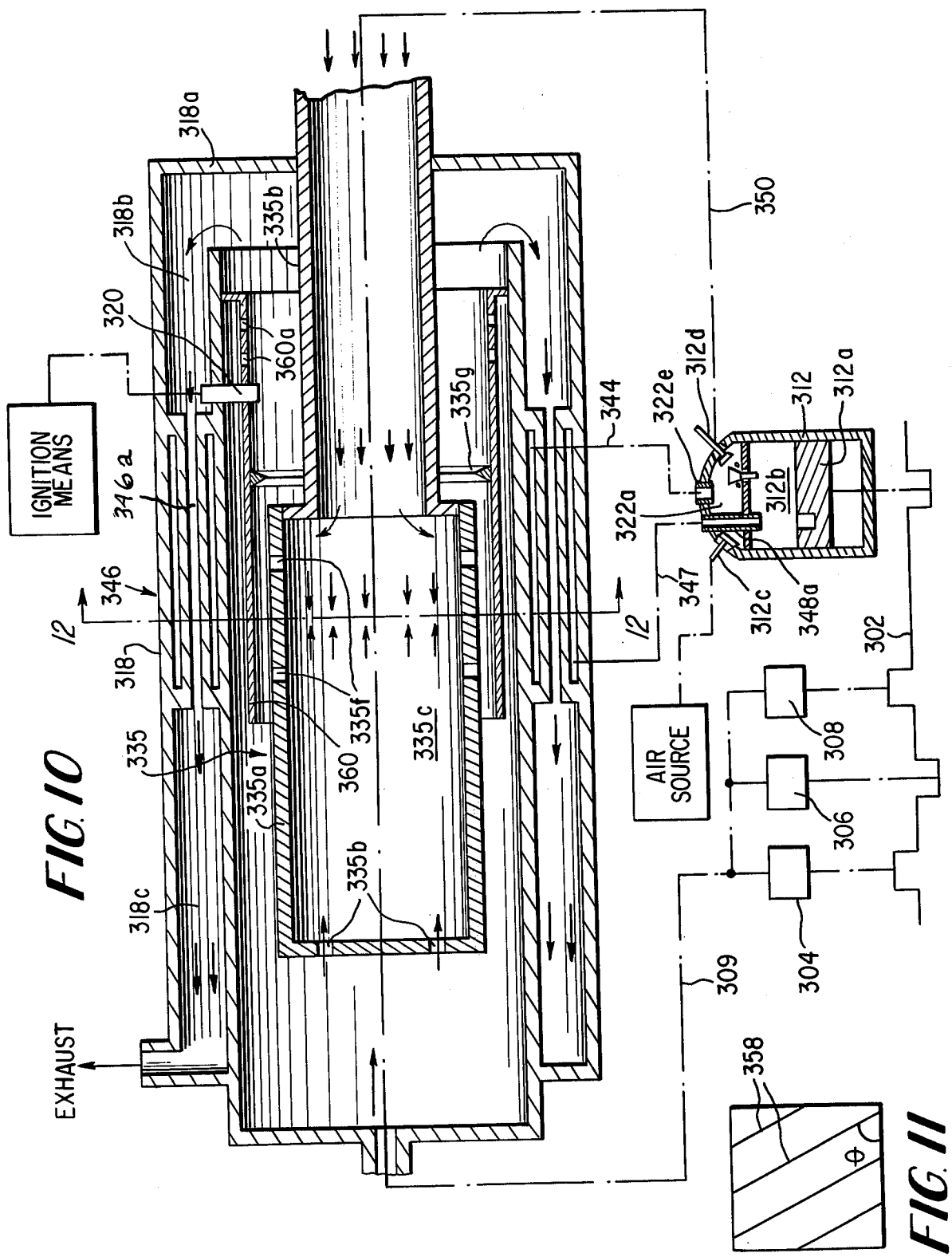

COMBUSTION MEANS FOR A LOW-POLLUTION ENGINE

This application is a continuation-in-part of the prior U.S. Pat. application Ser. No. 306,721 filed Nov. 15, 1972 now abandoned entitled "Pollution-Free Internal Combustion Engine."

In recent years, numerous attempts have been made to produce an efficient, compact and relatively inexpensive pollution-free engine which will not contaminate the environment. Pollution due to automotive vehicles have been the subject of extensive legislation, and the automotive industry is now attempting to comply with the law in their designs and to meet ultimately the pollution-control standards.

One proposal for reducing pollution is to add a catalytic converter to the engine exhaust. In accordance with another proposal, the pollutant level of an internal combustion engine is reduced by effecting a more complete combustion of the exhaust gases. Examples of this latter type of pollutant control are presented in the U.S. patents to Knowles U.S. Pat. No. 3,444,686, Kim U.S. Pat. No. 3,513,929 and Warren U.S. Pat. No. 3,577,729. In the Kim patent, the pollution control system includes an interburner which completes the combustion of unburnt hydrocarbons and carbon monoxide from the internal combustion engine, a gas turbine which recovers power from the hot exhaust leaving the interburner, and a compressed air reservoir which serves as a power storage tank and which supplies compressed air to a plurality of air motors. In the Warren patent, combustion of exhaust gases is achieved in a combustion chamber that is separate from the compression and expansion cylinders of the engine. In accordance with a proposal disclosed in the Cambell U.S. Pat. No. 2,645,216, the exhaust gases of an internal combustion engine are recirculated back into the cylinders after suitable enrichment with oxygen, a small amount of the exhaust being bled off equivalent to the increase in carbon dioxide and water caused by combustion of the fuel. While the various proposals of the prior art have merit, they are generally quite complex and relatively expensive, and furthermore they do not readily lend themselves in retrofit upon existing internal combustion engines.

It is also known that when an internal combustion engine operates in a fuel-lean mode, the combustible hydrocarbon and carbon monoxide pollutant concentrations are relatively low, while for fuel-rich operation, the concentrations of these pollutants are relatively high. On the other hand, the noxious oxides of nitrogen are a maximum when the internal combustion engine is operated near the correct air-to-fuel ratio, but are much reduced when the engine is operated either in the fuel-rich mode or in a fuel-lean mode. A comprehensive discussion of the problems of pollutant control is presented in the article "How Clean a Car," John B. Heywood, *Technology Review*, Volume 73, Number 8, June 1971, Alumni Association of the Massachusetts Institute of Technology.

Accordingly, a primary object of the present invention is to provide an improved substantially low-pollution internal combustion engine, characterized by the provision of combustion means for burning at one atmosphere a mixture of air and the fuel-rich exhaust gases of an internal combustion engine. The burning of the exhaust gases—which are rich in hydrocarbons and carbon monoxide and are low in oxides of nitrogen—is accomplished by a flame having a temperature range of from about 2500° Rankine to about 3300° Rankine to effect rapid, substantially complete combustion of the hydrocarbon and carbon monoxide components, the formation of undesirable oxides of nitrogen being inhibited by the low flame temperature. Preferably the fuel-to-air ratio of the mixture is near, and on the lean side of, stoichiometric.

Another object of the present invention is to provide apparatus of the type described above including air cylinder means for supplying the combustion air. The air cylinder means may comprise either reciprocatory piston means or rotary means each driven by the crankshaft of the internal combustion engine.

According to a further object of the invention, energy converter means are provided for converting to useful mechanical energy the heat energy of the burner flame. More particularly, heat exchanger means responsive to the burner flame are provided for heating air supplied during a compression stroke of the piston of reciprocatory air cylinder means and for returning the heated air as a source of mechanical energy to the piston of said air cylinder means during air expansion stroke thereof.

Another object of the present invention is to provide a low-pollution internal combustion engine in which the need for a conventional muffler is obviated.

A further object of the invention is to provide a substantially pollution-free air motor means for driving a rotary shaft, including an air cylinder, a reciprocatory piston mounted in said cylinder, energy storage means for storing the air compressed in the working chamber of said air cylinder during a compression stroke of said air piston, means for returning the compressed air from said storage means to said working chamber during an expansion stroke of said piston, and heat exchanger means for heating the compressed air at least during the time it is being returned from the energy storage means to the working chamber. Preferably the heat exchanger means is heated by the flame of burner means to which is supplied compressed air from said working chamber, and a combustible fuel, the air being supplied in a sufficient quantity as to effect complete combustion of fuel without the production of pollutants.

According to a more specific object of the invention, an improved substantially pollution-free engine is provided in which a plurality of internal combustion piston motors are intentionally operated in a fuel-rich mode, whereby the combustible hydrocarbon and carbon monoxide pollutants are sufficiently large to sustain a flame usable as a heat source sufficient to be converted to mechanical energy through reciprocating piston means and the oxides of nitrogen pollutants are at an acceptable level. The exhaust gases from the internal combustion engine are mixed with air for complete combustion by burner means contained in a combustion chamber, thereby converting the hydrocarbons and carbon monoxide to water and carbon dioxide and at the same time providing heat energy to be converted to mechanical energy through reciprocating piston means. Preferably the temperature of the burner flame is maintained within the range of from about 2500° Rankine to about 3300° Rankine, whereby wall temperature is about 2600° Rankine to effect substantially complete combustion of the hydrocarbon and carbon monoxide components, the formation of undesirable oxides of nitrogen being inhibited during the time the gas spends at the given flame temperature and the relatively low (one atmosphere) combustion pressure.

In accordance with another object of the invention, energy conversion means are provided for converting the heat energy of the combustion flame to useful mechanical energy that is applied by reciprocating means to the crankshaft of the engine. In one embodiment, means defining an air compression and expansion system are provided, said system including an air motor having a piston connected with the crankshaft, an auxiliary energy storing means consisting of an energy storage device separated from a storage chamber by a free piston (not connected to the crankshaft), and heat exchanger means connected between a working chamber in the air motor and the storage chamber of the energy storage means, said heat exchanger being arranged to be heated by the flame of the burner means. The energy storage means is operable near the end of the compression stroke of the air piston to receive the compressed air supplied from the air motor (which is then operating as a storage means), which compressed air is heated during transport to said storage means through the heat exchanger means. By operation of the energy storage means, the compressed heated air is returned to the working chamber of the air motor via the heat exchanger and is expanded to apply mechanical energy to the air piston during its expansion stroke thereby transmitting power to the crankshaft. According to a second embodiment, the enerby storage means includes a piston-free storage chamber of constant volume, first conduit means including by-pass valve means being provided for supplying compressed air to said storage chamber during the compression stroke of said air piston, and second conduit means being provided for returning the compressed air from said storage chamber to said working chamber via said heat exchanger means during the expansion stroke of said air piston.

A further object of the invention is to provide air motor means of the type described above wherein the energy storage means is physically arranged either remote from the air cylinder, or is mounted directly on the end wall of the air cylinder that is adjacent the air piston when said air piston is at the end of its compression stroke. In the latter embodiment, the end wall—which may comprise a plate that is retrofit to an existing internal combustion engine—contains a port that affords communication between said working and storage chambers, valve means being provided for closing said port when the pressure in the storage chamber exceeds a given value. Conduit means are provided for connecting opposite ends of said heat exchanger means in constant communication with said working and storage chambers, respectively. As a refinement, flow control means—such as a stub valve, a suitable flow restrictor, or the relative lengths of the conduit ends—serve to assure that a greater volume of compressed air is supplied from the working chamber to the storage chamber than to the heat exchanger means during a compression stroke of the air piston.

According to another object, the heat exchanger means may be either of the stacked plate type arranged directly in the flame of the burner means, or of the annular type arranged concentrically about the combustion chamber or adjacent thereto for heating thereby. In the concentric case, the combustion chamber may include means for reversing the flow of the exhaust gases from the combustion chamber through 180° for axial passage through said annular heat exchanger means. Guide vane means may be provided in the axial passage of said heat exchanger means for effecting flow that exceeds a minimum Reynolds number to produce turbulency that enhances the heat exchange operation.

According to another feature of the invention, means including an exhaust valve, a surge tank and means defining at least one orifice are provided for conducting, during an exhaust stroke of the air piston, compressed air from the working chamber via mixing means to the burner means to effect complete pollution-free combustion of the fuel. In one embodiment, the surge tank means is remote from the mixing means and the combustion chamber, while in a second embodiment, the surge tank means is arranged within the mixing means. Preferably the volume of the surge tank means is designed to accommodate all of the compressed air delivered on the exhaust stroke of the air piston at burner pressure (1 atmosphere). Metering orifice means are provided for discharging the air to mix with the fuel to give the desired air-fuel ratio for transfer in a turbulent condition into the combustion chamber.

A further object of the present invention is to provide a substantially pollution-free engine of the type described above, wherein at least one working cylinder of the cylinder bank of an internal combustion engine functions as an air motor, thereby affording the advantage of the retrofit application of the invention to existing automotive vehicles. In accordance with one embodiment of the invention as applied to a V-8 engine, each of the two banks of the engine includes three internal combustion piston motors, and one air piston motor. In the alternative, the air piston motor operating in accordance with the present invention may include a cylinder that is separate from the block of the internal combustion engine. The air piston motor may be designed for two-stroke cycle or four-stroke cycle operation.

It is an additional object of one embodiment of the present invention to provide a substantially pollution-free engine of the type where each of its cylinders (air piston motors) operates in an air compression and expansion mode in combination with a heat exchanger arranged to be heated by a combustion flame and energy storing mechanism wherein the combustion is in a fuel-lean mode to avoid the high production of the oxides of nitrogen, hydrocarbons and carbon monoxide.

In accordance with a more specific object of the invention, the operation of the energy conversion system of the combustion flame is achieved without the use of any valve means, whereby the working chamber of the air motor may be connected directly with the heat exchanger and the storage chamber of the energy storage means, thereby affording the advantage that the air compression and expansion system can be operated with no danger of burning valve seats or valves and at about 2500° Rankine to inhibit the formation of the oxides of nitrogen. In accordance with this embodiment, the energy storage means may comprise an auxiliary cylinder in which is mounted for free reciprocatory movement an auxiliary piston which defines at opposite ends of the cylinder a storage chamber and an energy storage device (i.e., a pressure air chamber), respectively, the storage chamber being maintained in constant communication with the working chamber of the air motor via the heat exchanger. When a pressure air chamber is used as an energy storage device, air under pressure is supplied to the pressure air chamber to bias the auxiliary piston to a first position in which the volume of the storage chamber is a minimum. The biasing force on the auxiliary piston is such that near the end of the compression stroke of the air piston, the force of the compressed air acting on the auxiliary piston exceeds that of the biasing means, whereupon the auxiliary piston is acted on to displace it towards a second position in which the volume of the storage chamber is a maximum. The compressed air is then transmitted from the air motor to the storage chamber and is heated during passage through the heat exchanger. During the expansion stroke of the air motor, the heated compressed air is forced through the heat exchanger where it is heated further and returned to the working chamber of the air motor and is expanded to apply power to the air piston.

Other objects and advantages of the invention will become apparent from a study of the following specification when viewed in the light of the accompanying drawing, in which:

FIG. 1 is a diagram illustrating the manner in which the pollutant emissions from a given internal combustion automobile engine vary with the fuel-air ratio in the combustible mixture;

FIG. 1a is a curve illustrating a typical equilibrium concentration of oxides of nitrogen versus air-fuel ratio (at 1 atmosphere, 2340° Rankine);

FIG. 2 is a diagrammatic illustration of the present invention as applied to one bank of four cylinders of a standard V-8 engine;

FIG. 4 is a side elevational view of one embodiment of the heat exchanger means of FIG. 2;

FIG. 5 is a sectional view taken along line 5—5 of FIG. 4;

FIG. 7 is a diagrammatic illustration of another embodiment of the invention wherein the energy storage means comprises a piston-free housing of uniform volume;

FIG. 8 illustrates diagrammatically a modification of the embodiment of FIG. 7 wherein the energy storage means is mounted on the air cylinder, use being made of heat exchanger means of the stacked plate type;

FIG. 9 is a pressure-volume flow diagram illustrating the operation of the air motor means of FIG. 8;

FIG. 10 illustrates diagrammatically a modification of the apparatus of FIG. 8 wherein the heat exchanger means is of the annular type arranged concentrically about the combustion chamber;

FIG. 11 is a diagrammatic representation of the guide vane means for effecting turbulent flow of the combustion exhaust gases through the heat exchanger means of FIG. 10.

Figure 3:
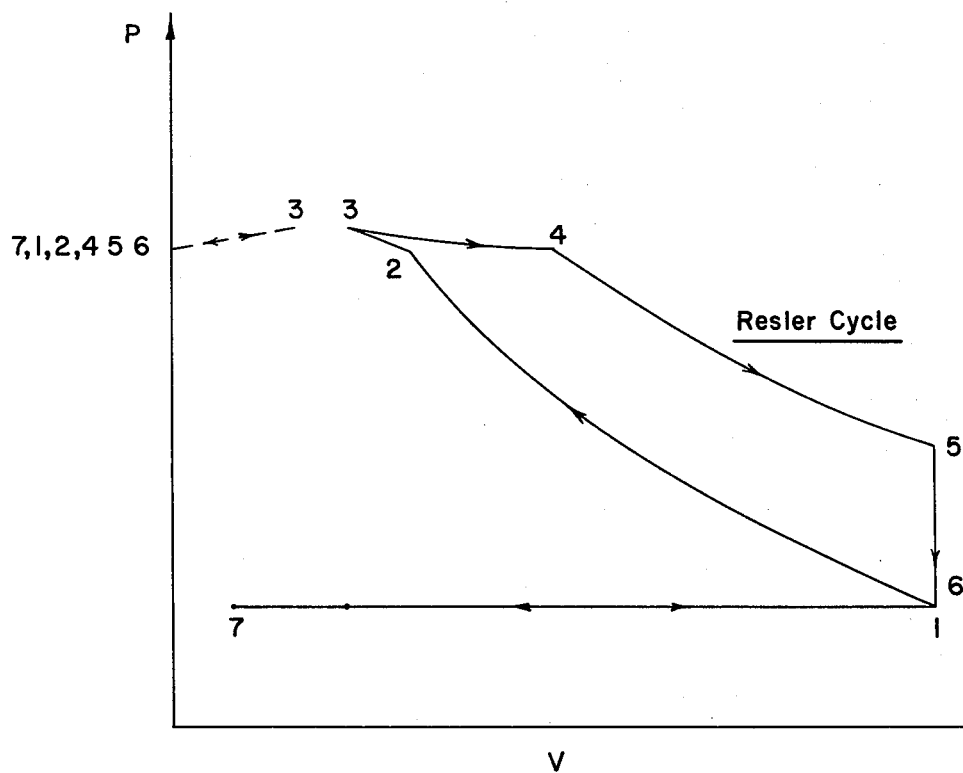
FIG. 3 is a pressure-volume diagram illustrating the operating cycles of the air motor and an energy storage means of the present invention.

Referring first more particularly to the pollutant emission curves of FIG. 1, it is apparent that internal combustion engines operated in a fuel-lean (i.e., excess air) mode produce emissions that are relatively low in hydrocarbon and carbon monoxide, while in a fuel-rich mode, pollutant emissions are produced that are high in hydrocarbon and carbon monoxide pollutants. It is further noted that the oxides of nitrogen pollutants are a maximum when the engine is operated near the correct fuel-to-air ratio to fully burn the fuel, but are much less when the engine is operated either in a fuel-lean mode or in a fuel-rich mode. In accordance with the present invention, the internal combustion piston motors are operated in a fuel-rich mode as shown by the vertical line R, whereby the exhaust gases produced thereby contain a relatively high concentration of the combustible hydrocarbon and carbon monoxide pollutant components, but a relatively low concentration of the noxious oxides of nitrogen.

FIG. 2 EMBODIMENT

Referring now to FIG. 2, one bank of four cylinders of a conventional V-8 engine is illustrated having a conventional crankshaft 2. Three of the cylinders 4, 6 and 8 are operated as conventional internal combustion motors that include reciprocatory pistons $4a$, $6a$ and $8a$ each connected with the crankshaft 2, ignition chambers $4b$, $6b$ and $8b$ connected with the carburetor 10 via intake valves $4c$, $6c$ and $8c$, respectively, exhaust valves $4d$, $6d$ and $8d$ connected with an exhaust manifold 9, and an ignition system including spark plugs (not shown). In accordance with the present invention, the carburetor is so adjusted that all the internal combustion piston motors 6, 8 and 10 operate in the fuel-rich mode.

In accordance with a characterizing feature of the present invention, the remaining cylinder 12 of the cylinder bank is alternately operated as an air motor and an air pump having a reciprocatory piston $12a$ that is also connected with the crankshaft 2, said piston defining in the air cylinder a working chamber $12b$. In the illustrated four-cycle embodiment, the air motor includes also air intake valve $12c$, exhaust valve means $12d$, and an unobstructed valve-less opening $12x$ the purpose of which will be described below. Preferably, the intake valves $4c$, $6c$, $8c$ and $12c$ and the exhaust valves $4d$, $6d$, $8d$ and $12d$ are operated by conventional cam means (not shown).

The exhaust valves $4d$, $6d$ and $8d$ of the internal combustion cylinders are connected with burner means 16 arranged in a combustion chamber 18. Air is supplied to the combustion chamber 18 from working chamber $12b$ via exhaust valve $12d$, surge tank 35 and air inlet orifice $18a$, whereby upon initial ignition of the combustible vaporous mixture of hydrocarbons, carbon monoxide and air by conventional igniter means 20 (for example, a spark plug), the burner means produces a continuous self-sustaining flame $16a$. Preferably the air supply is such as to produce a fuel-to-air ratio near, and on the lean side of, stoichiometric, thereby to effect complete combustion of the hydrocarbons and the carbon monoxide, whereby water and carbon dioxide are produced which are exhausted from the combustion chamber with a minimal amount of oxides of nitrogen. More particularly, referring to FIG. 1a, a curve is presented illustrating a typical equilibrium concentration of oxides of nitrogen versus air-fuel ratio (at 1 atmosphere, 2340° R.) as discussed in the article entitled "Calculation of Equilibrium Composition of Automotive Exhaust Gases" by Remo del Grosso, 2nd Eng. Chem. Process Des. Develop., Vol. 12, Nov. 3, 1973, pp. 390–394. In the temperature range 2600°–3300° R., the equilibrium NO concentration is not objectionable if the exhaust mixture is rich. However, if the exhaust mixture is lean, the equilibrium nitric oxide concentration is above the required standards. Thus as long as the exhaust mixture is maintained rich, one need not worry about further formation of nitric oxide. When additional air is added to the moving exhaust to remove the hydrocarbons and the carbon monoxide, the length of time spent at the flame temperature must be limited to prevent the unwanted formation of nitric oxides. Furthermore, the structural components are so designed and adjusted that the temperature of the flame is in the range of from about 2500° to about 3300° Rankine, giving a wall temperature of approximately 2600° Rankine, whereby the formation of oxides of nitrogen is avoided.

In accordance with a characterizing feature of the invention, energy conversion means are provided for converting to useful mechanical energy the heat produced by the combustion of the exhaust gases in the combustion chamber 18. To this end, an energy storage means is provided including an auxiliary cylinder 22 which contains a free reciprocatory auxiliary piston 24 that defines at opposite ends of the auxiliary cylinder a storage chamber 22a and a pressure air chamber 22b used as a convenient energy storyng device, respectively. The storage chamber 22a is connected and maintained in constant open communication with the working chamber 12b of the air motor cylinder 12 by means of a conduit 26 that is connected at one end with the unobstructed air cylinder opening 12x and contains intermediate its ends a heat exchanger portion 26a arranged in the combustion chamber 18 for heating by the burner flame 16a. Air from pressure air source 28 is supplied to the air pressure chamber 22b of auxiliary cylinder 22 via one-way check valve 30, said check valve being operable to maintain a predetermined constant pressure in air pressure chamber 22b. The pressure air source 28 as shown is a pressure tap on the wall of cylinder 12 appropriately located to pick up the desired air pressure during each compression stroke if needed to maintain the desired pressure level in air pressure chamber 22b. There are many alternatives for providing the energy storage. The air pressure source could even be separate from the tap as shown and the fluid in chamber 22b could be other than air. The storage means could also be mechanical, such as a spring, etc. Consequently, the auxiliary piston is biased toward a position in which the volume of the storage chamber 22a is a minimum.

The operation of the substantially pollution-free engine of FIG. 2 will now be described, reference being made to the pressure-volume curves of FIG. 3 wherein the solid and dashed lines illustrate the operating cycles of the air acted on between piston 12a and the free auxiliary piston 24 and the volume of air in storage chamber 22a, respectively.

Assume that the air piston 12b is initially in its lowermost position in FIG. 2 (Point 1 in FIG. 3), whereupon the volume of working chamber 12b of air cylinder 12 is a maximum. Owing to the pressure established by the pressure air in chamber 22b, auxiliary piston 24 is biased toward its lowest first end position in which the volume of storage chamber 22a is a minimum.

As air piston 12a is displaced in the compression direction by its connection with the crankshaft 2, the volume of working chamber 12b is progressively decreased and the pressure of the air compressed therein is progressively increased (Point 1 to Point 2), the auxiliary piston 24 being maintained in its lowest first end position by the biasing force of the pressure air in pressure air chamber 22b. When the air piston 12a reaches a position adjacent its top dead center (Point 2, FIG. 3), the pressure of the compressed air in working chamber 12b becomes sufficient to overcome the biasing force of the air in pressure air chamber 22b, whereupon the auxiliary piston 24 begins its travel to its second end position where the volume of storage chamber 22a is maximum. Air piston 12a continues its motion (from Point 2 to Point 3) to further reduce the volume of working chamber 12b to a minimum and to displace the compressed air therefrom to storage chamber 22a via continuously open conduit 26. During transport of the compressed air through heat exchanger portion 26a of conduit means 26, the compressed air is heated to a relatively high temperature by the flame 16a, the heat energy being retained in the compressed air that is stored temporarily in the storage chamber 22a and the heat exchanger 26a.

As the air piston 12a moves during the initial portion of its expansion stroke (from Point 3 to Point 4 on the solid line), the pressure in the working chamber of the air motor decreases slightly because of the action of auxiliary piston 24 decreasing the volume of the storage chamber 22a (from Point 3 to Point 4 on the dashed line adjacent the ordinate axis). The compressed heated air then further expands (Point 4 to Point 5 on the solid line) continuing to apply energy in the form of mechanical power to the crankshaft via the air piston 12a. At the end of the expansion stroke, the cam-operated exhaust valve 12d opens to connect the working chamber 12b with the combustion chamber orifice opening 18a via a surge tank 35. The pressure in working chamber 12b decreases (Point 5 to Point 6 on the vertical solid line), and during the next compression stroke of the air piston, the remaining air is delivered to the combustion chamber via the surge tank 35 to support combustion of the exhaust gases by the burner 16 (Point 6 to Point 7). Valve 12d is then closed by the action of the camshaft and during the next expansion stroke of the air cylinder, air is drawn into working chamber 12b through the camshaft operated intake valve 12c from a filtered air source 36.

It is a fundamental advantage of the teachings of the present invention that its implementation in practice can benefit from the high level of technology in the reciprocating engine field. Variations from the essential features described and the actual design of the components for the particular desired objective will be apparent to those skilled in art and the variation and design alternatives will be numerous.

One alternative is to use the air intake of carburetor 10 after air filtering and prior to the carburetion step as a filtered air source replacing the source 36 shown. It may also be advantageous to alter the size of orifice 18a where exhaust air from the working chamber is metered into the combustion chamber 18 under a variety of engine speed and engine temperature conditions through standard mechanism responsive to those conditions. The fundamental teachings of the present invention combined with the high level of technology in the reciprocating engine field make such variations readily practical.

While the air motor has been illustrated as having a four-stroke cycle, it is apparent that it could also be designed to operate on a two-stroke cycle. As indicated above, the air motor may include a cylinder that is part of a conventional internal combustion engine, or it may constitute a means separate from the conventional engine block.

FIG. 6 EMBODIMENT

Figure 6:
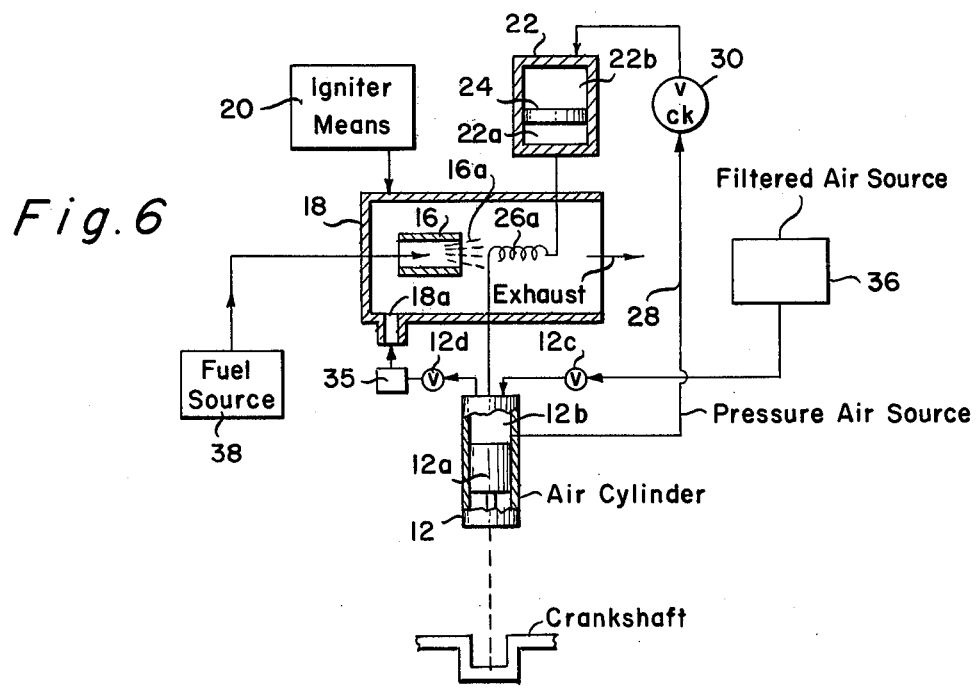
FIG. 6 is a diagrammatic illustration of a modification of the embodiment of FIG. 1 wherein the combustion means for heating the heat exchanger is supplied from a separate fuel source and is operable in the fuel-lean mode to avoid the high production of the oxides of nitrogen, hydrocarbons and carbon monoxides.

While the teachings of the present invention are shown in FIG. 1 as being used to modify the operation of an engine running in an internal combustion mode, it is also a reasonable alternative that such teachings may be used in an engine where every cylinder operates with air as its working substance in the fashion described herein as cylinder 12 (air motor) in combination with an energy storing means operating in the manner shown hereinabove in connection with FIG. 2. FIG. 6 illustrates the fundamental necessary components for a single cylinder embodiment of the same. Such embodiment would, of course, not have the fuel-rich exhaust from other cylinders working on an internal combustion fuel-rich mode and therefore would have to have another fuel source shown as block 38 of conventional design and as a part of the teachings of the present invention the fuel would be supplied in a fuel-lean mode at a level so that the oxides of nitrogen, the hydrocarbons and the carbon monoxides and other pollutants all would be at a low level in the exhaust from the heat exchanger. The fuel source could be other than vaporized fuel such as powdered coal or the like. When one or more of such cylinders are designed to operate in the cycle as described, the cranking operation to start would be more lengthy and comparable with the cranking operation in jet engines.

The variations of design using the teachings of the present invention are many. While the internal combustion engines are shown herein as spark ignition engines, those same internal combustion cylinders could also be of a fuel injection type, i.e., diesel. The teachings of the present invention are compatible with the in-line as well as the V block and all other internal combustion engine configurations. They are also compatible with valve in head and overhead valve geometrical arrangements.

FIG. 7 EMBODIMENT

Referring now to FIG. 7, an embodiment of the invention is illustrated wherein the energy storage means comprises a piston-free housing 122 containing a storage chamber 122a of constant volume, said storage chamber being connected with the working chamber 112b of the air cylinder 112 via first conduit means 140 containing by-pass check valve means 142. The storage chamber 122a is also connected with the working chamber 112b via second conduit means 144 in which is directly connected the heat exchanger 146. These second conduit means may terminate in valve means 148 which may include, if desired, a male projection 148a that extends downwardly from the upper wall of the air cylinder for cooperation with an associated recess 148b contained within the upper end of air piston 112.

In operation, air from source 136 enters the working chamber 112b via the cam-controlled inlet valve 112c, whereupon during the compression stroke of the air piston 112, compressed air is supplied to storage chamber 122a via the check valve 142. In order to assure that more compressed air flows initially from the working chamber to the storage chamber via first conduit means 140 rather than the second conduit means 144 (which contains the heat exchanger means 146), the second conduit means is caused to have a greater flow resistance than said first conduit means (for example, by the use of conventional flow restrictor means, relative conduit length or orifice size, or the like). Near the end of the compression stroke, the stub valve means 148 operate to further restrict, if necessary, the flow of compressed air through the second conduit means 144, whereupon the bulk of the remaining compressed air is transmitted to the storage chamber via the first conduit means 140. Owing to the pressure of the compressed air in storage chamber 122a, check valve 142 closes, whereupon during the expansion stroke of the air piston 112a, compressed air is returned from energy storage chamber 122a via second conduit means 144, heat exchanger means 146 and valve means 148. The heat energy of the flame from burner 116 heats the compressed air flowing through the heat exchanger means, which heated air acts on the air piston 112a to supply mechanical energy thereto during its expansion stroke. At the end of the expansion stroke of air piston 112a, exhaust valve 112d opens to supply air during the exhaust stroke to the burner metering device 116 via surge tank means 135 in a manner such that air is supplied to the burner so as to effect complete combustion of the fuel, thereby to reduce to a minimum the pollutants contained in the combustion exhaust gas. Preferably the flame has a temperature range of from about 2500° Rankine to about 3300° Rankine to prevent the formation of oxides of nitrogen as discussed above.

The piston-free energy storage means 122 of FIG. 7 offers certain advantages over the piston-type storage means of FIGS. 2 and 6. For example, in the piston-free embodiment, the possibility of a quantity of unheated residual air in the conduit means leading to the heat exchanger from the working chamber is avoided. Furthermore, in addition to the elimination of a moving part (namely, the auxiliary piston), undesirable heating of the compressed air during transport to the storage chamber is avoided, thereby improving the efficiency of operation.

While the valve 142 has been illustrated and described as being a check valve, it is apparent that use could be made of a cam-operated valve, if desired.

FIG. 8 EMBODIMENT

Instead of providing energy storage means that are physically remote from the air cylinder, the housing means defining the energy storage chamber could be mounted directly on the air cylinder as shown in FIG. 8. In this embodiment, the energy storage chamber 222a defined by housing 222 is arranged on the opposite side of the wall 250 that defines the upper wall of air cylinder 212. In the case of retrofit application to an existing internal combustion engine, the wall 250 may comprise a special plate that is secured in the cylinder bore or head of the engine. The end wall 250 contains a port 240 that affords communication between working chamber 212b and storage chamber 222a. Air is supplied from source 236 to storage chamber 222a via cam-operated inlet valve 212c, and air is exhausted from storage chamber 222a via cam-operated exhaust valve 212d. Normally open by-pass check valve means 242 (which corresponds generally to the by-pass valve 142 of FIG. 7), serves to close the port 240 when the pressure in storage chamber 222a exceeds the pressure in working chamber 212b by a given value determined by a spring or other suitable means including cam operation.

The housing 222 contains a further opening 222e that is connected by conduit means 244 with one end of the heat exchanger means 246. The other end of heat exchanger means 246 is connected with working chamber 212b via conduit 247 and stub valve means 248 having a male component 248a that extends downwardly through chamber 222a and end wall 250, and a recess 248b contained in the upper surface of air piston 212a. In the alternative, the conduit 247 may communicate directly with chamber 212b. If desired, the male and female components of the stub valve means may be reversed.

The fuel-rich exhaust gases from the internal combustion piston motors 204, 206, 208 (which operate in the fuel-rich mode and include pistons connected with the same rotary output shaft 202 as air piston 212a) are connected with one end of mixing chamber 218 via conduit 209.

According to an important feature of this embodiment, the surge tank means 235 for smoothing the supply of compressed air to the burner means is arranged directly within the mixing chamber housing 218 preceding the combustion zone, thereby to increase the efficiency of mixing. The surge tank means includes a hollow surge member 235a arranged coaxially within the combustion chamber. The surge member has an end wall containing suitable apertures 235b for introducing into the surge chamber 235c the combustible fuel-rich exhaust gases from the internal combustion cylinders. An air pipe 235d is provided that communicates with the other end of the surge member, said air pipe being connected with the air cylinder exhaust valve means 212d via an air conduit 251 for discharging air into the surge chamber 235c in a direction opposite to that of the exhaust flow. The momentum of the two opposing fluid flows establishes within the surge chamber an effective "fluid spring" effect (indicated diagrammatically by the line 235e) which is axially displaceable of the surge chamber as a result of the instantaneous pressure differential between the fuel and air fluid pressures. Consequently, during the times of periodic closure of the exhaust valve 212d, the surge tank means functions to continue the uniform supply of the desired fuel-air mixture to the combustion chamber 218b via the metering orifices 235f. Ignition of the fuel-air mixture is effected by the ignition means 220, whereby a flame having a temperature of a range of from about 2500° Rankine to about 3300° Rankine is established for heating the heat exchanger means 246.

The sharp circular edge (turbulence trip) 235g causes a vortex effect to produce turbulency in the fuel-air mixture which further assures complete combustion of the fuel with a fuel-lean flame. Preferably the surge chamber 235c is designed to accommodate all of the air delivered on the exhaust stroke at the burner pressure.

In order to assist in the cold starting of the apparatus, a tubular cold start partition 260 is arranged in concentrically spaced relation between surge housing 235 and the wall of mixing chamber 218. This partition divides the exhaust gases into two parts so that just enough exhaust gases are mixed with the air from the surge chamber orifices 235f to facilitate a cold start. This is because at ambient temperature there is a minimum percentage of oxygen necessary to burn a combustible mixture (flamability limits). The balance of the exhaust gases are then mixed into the already burning flame via orifices 260a, and because the initial flame has increased the temperature, the remainder of the exhaust gases are easily burned.

The operation of the energy storage means of FIG. 8 will now be described with reference to the pressure-volume diagram of FIG. 9. During the period 1-2, the intake valve 212c opens to supply air to the working chamber 212b via the normally open bypass valve 242, and the air piston 212a moves downwardly during its intake stroke. During the following compression stroke 2-3, the inlet and outlet valves 212c and 212d are closed, whereupon compressed air is supplied to the energy storage chamber 222a via conduit 247, heat exchanger means 246, conduit 244 and opening 222e, and also via port 240 and valve 242. Near the end of the compression stroke (Point 2a in FIG. 9), the stub valve means 248 so restricts the passage through male component 248a that compressed air is supplied to the storage chamber only via port 240. During the period 3-4 of FIG. 9, by-pass valve 242 is closed by the pressure air contained in storage chamber 222a, and during the initial period 4-5 of the following expansion stroke, the stub valve means 248 remains closed. When the stub valve means 248 is uncovered at Point 5, the pressure in working chamber 212b increases (5-6), so that during the remainder of the expansion (i.e., power) stroke (6-7), the compressed air flows from the storage chamber 222a to the working chamber via opening 222e, conduit 244, heat exchanger means 246, conduit 247 and valve means 248. The heat of the combustion flame is therefor transformed by the heated gas to useful mechanical energy that is applied to the output shaft 202 by the air piston 212a. At point 7, exhaust valve 212d opens, whereupon air is supplied to the surge chamber 235c during periods 7-8 and 8-9. At point 9 the exhaust valve 212d closes and intake valve 212c opens, whereupon the cycle is repeated. Although the system has been described as being of four-cycle operation, it is apparent that the system is suitable for two-cycle operation as well.

FIG. 10 EMBODIMENT

Figure 12:
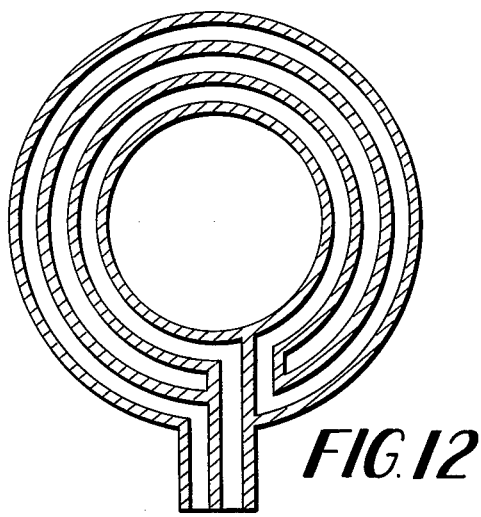
FIG. 12 is a sectional view taken along line 12—12 of FIG. 10.

In the prior embodiments, the heat exchanger means have been illustrated and described as being of the stacked spaced plate (i.e., "Baker shelf") type arranged for direct heating by the burner flame. Referring now to the embodiment of FIG. 10, the heat exchanger means 346 are of annular construction arranged concentrically about the surge tank means 335. The combustion chamber 318 is provided with a transverse end wall 318a for reversing the flow of the combustion exhaust gases backwardly through an angle of 180°, whereupon the hot exhaust gases pass to atmosphere through the annular passage 318b, axially through the heat exchanger means, and through the annular passage 318c. The heat energy from the combustion flame is transmitted to the compressed air that flows from storage chamber 322a to working chamber 312b via conduit 344, the flow path through heat exchanger means 346 (which is reversed back upon itself as shown in FIG. 12), and conduit 347, the heat energy being transformed and applied as mechanical energy to the output shaft 302 during the expansion stroke of air piston 312a.

Owing to the accurate metering of the air supplied to the combustion chamber relative to the fuel supply, the operation of the surge tank means, the given flame temperature (i.e., about 2500°–3300° Rankine) and the 1 atmosphere combustion chamber pressure, complete combustion of the fuel is effected without the formation of undesirable oxides of nitrogen, whereupon the exhaust gases finally discharged to atmosphere are substantially pollution-free. Furthermore, the combustion gases flowing through the passages 318b and 318c are cooled by the compressed air that flows from the storage chamber to the working chamber via the heat exchanger.

In order to enhance the heat transfer from the combustion gases to the compressed air flowing through the heat exchanger means, a desired degree of turbulency is achieved by providing helical guide vanes on the surfaces of the axial passage 346a through the heat exchanger. Referring to the diagrammatic representation of FIG. 11, preferably the helical guide vanes 358 have an angle ($\theta$) that produces a flow of the exhaust gases that exceeds a minimum Reynolds number, thereby to produce the desired turbulent flow. The guide vanes may be provided on either or both of the wall surfaces of the passage 346a, said guide vanes being angled to provide any type of desired heat exchanger configuration, such as parallel flow, cross flow, counter flow, or any combination of such flows.

FIG. 13 EMBODIMENT

Figure 13:
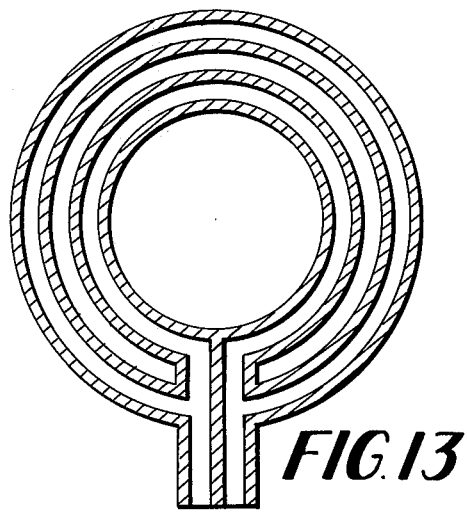
FIG. 13 is an alternative construction of the annular heat exchanger means of FIG. 12.

As shown by the sectional view of FIG. 12, the air flow path through the heat exchanger means of FIG. 10 is reversed back upon itself. However, it is also possible in the alternative, as shown in FIG. 13, to provide parallel concentrically arranged air flow paths through the annular heat exchanger.

FIG. 14 EMBODIMENT

Figure 14:
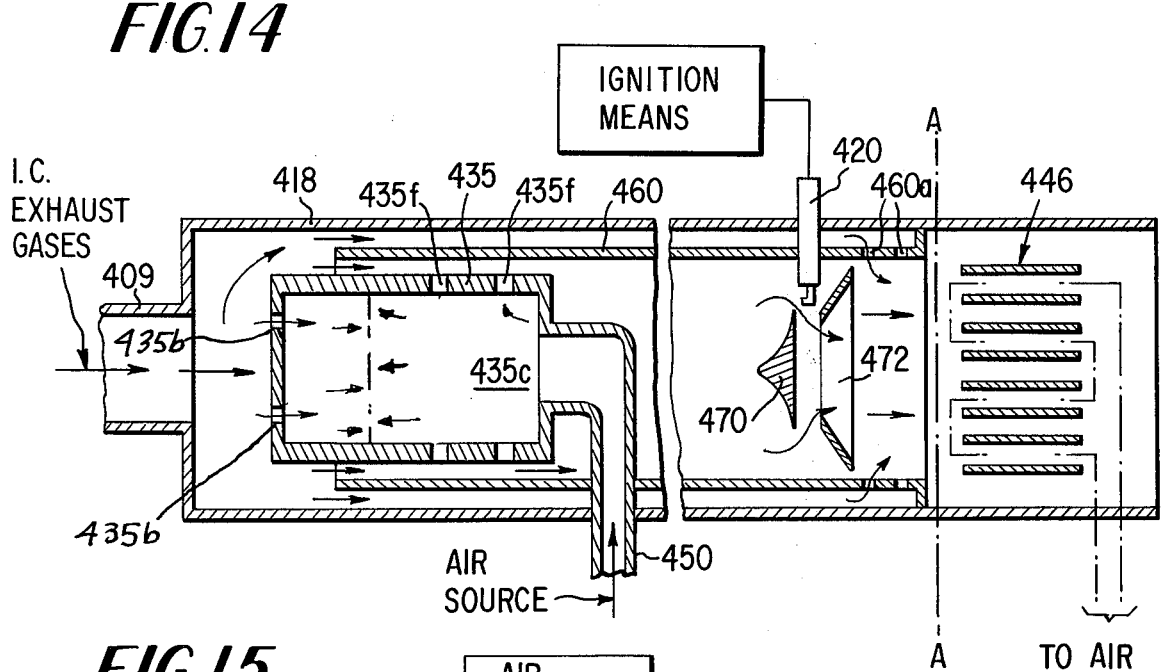
FIG. 14 is a diagrammatic illustration of another embodiment wherein the burner and heat exchanger means are remote from the mixer means.

Referring now to the embodiment of FIG. 14, the fuel-rich exhaust gases are supplied via conduit 409 into one end of the tubular housing 418 which contains in concentrically spaced relation therein the surge chamber means 435. A portion of the exhaust gases are introduced into the surge chamber 435c via the openings 435b for metering the air supplied at one atmosphere via conduit 450. The air is then emitted radially outwardly from the surge chamber via orifices 435f to mix with part of the exhaust and travels longitudinally of the housing around the outer edges of the turbulence trip means 470, and inwardly through the annular burner flame holder 472. At the point of maximum turbulency, the mixture is ignited by the igniter means 420. The combustion gases then proceed longitudinally through the heat exchanger means 446 and are exhausted to atmosphere. As in the embodiment of FIG. 8, in order to assist in cold starting of the burner means, a desired portion of the exhaust gases are conducted externally of the tubular partition 460, and radially inwardly into the combustion chamber via the orifices 460a.

The quantity of air supplied at one atmosphere to the surge chamber means 435 is such that a burner flame temperature of about 2500° Rankine to 3300° Rankine is established, thereby permitting complete combustion of the hydrocarbon and carbon monoxide components without the formation of the objectionable oxide of nitrogen pollutant.

FIG. 15 EMBODIMENT

Figure 15:
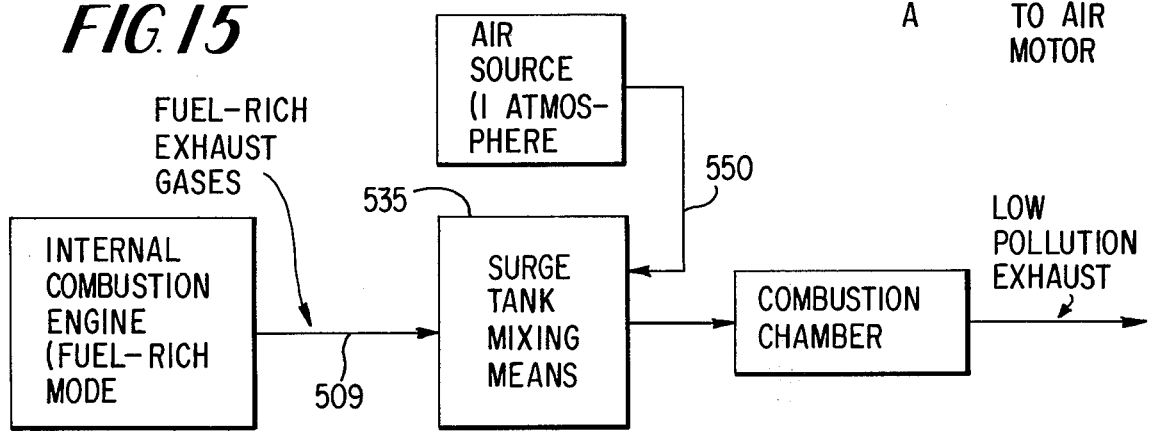
FIG. 15 illustrates another embodiment of the invention for effecting low-pollution combustion of the exhaust gases.

If desired, the heat exchanger means 446 to the right of line A—A of FIG. 14 may be omitted, thereby presenting the "flaming muffler" embodiment of FIG. 15 wherein the combustion gases are exhausted directly to atmosphere without any attempt to return the heat energy of the burner as mechanical energy to the engine output shaft. Again, the quantity of air supplied to the burner means at one atmosphere pressure is such as to establish a flame temperature of 2500° Rankine to 3000° Rankine, whereby the resultant pollution level of the internal combustion engine is at a minimum. This flaming muffler embodiment has been successfully substituted for the conventional muffler of an internal combustion engine, the exhaust gases being supplied by one group of cylinders of the engine and the combustion air being supplied by one or more other cylinders of the engine.

While in accordance with the Patent Statutes, the preferred form of the invention has been illustrated and described, it will be apparent that various changes and modifications may be made without deviating from the inventive concepts set forth herein.

What is claimed is:
1. Combustion apparatus, comprising
   a. internal combustion engine means operable in a fuel rich mode to produce exhaust gases rich in hydrocarbons and carbon monoxide and having a relatively low content of oxides of nitrogen;
   b. a source of air;
   c. mixing means for mixing the exhaust gases and the air to produce a fuel-to-air ratio near, and on the lean side of, stoichiometric; and
   d. burner means for burning said mixture at about one atmosphere pressure to produce a flame having a temperature range of from about 2500° Rankine to about 3300° Rankine for a period of time to effect rapid substantially complete combustion of the hydrocarbon and carbon monoxide components without the formation of additional undesirable oxides of nitrogen.

2. Apparatus as defined in claim 1, and further including a housing containing a chamber, said burner means including a burner member mounted in said housing for directing the burner flame longitudinally of said chamber toward one end thereof.

3. Apparatus as defined in claim 1, wherein said source of air includes an air cylinder.

4. Apparatus as defined in claim 3 wherein said source of exhaust gases comprises an internal combustion engine operable in a fuel-rich mode, said engine including a power output shaft, and further wherein said source of air includes an air cylinder having a piston driven by said power output shaft.

5. Apparatus as defined in claim 4, wherein said air cylinder constitutes a reciprocating air motor.

6. Apparatus as defined in claim 5, wherein said internal combustion engine includes a plurality of piston-cylinder motor means, and further wherein said reciprocating air motor comprises one of said piston-cylinder motor means.

7. Apparatus as defined in claim 6, and further including means for transforming to mechanical energy the heat energy of the burner flame and for applying this mechanical energy as driving power through said air motor, thereby to drive said engine output shaft.

8. Apparatus as defined in claim 1, and further including heat exchanger means for converting to useful mechanical energy the heat energy of said flame.

9. Apparatus as defined in claim 8, wherein said source of exhaust gases includes an internal combustion engine operable in the fuel-rich mode, and further including means for supplying as driving power to the output shaft of said internal combustion engine the useful mechanical energy by means of said heat exchanger means.

10. Apparatus as defined in claim 9, wherein said driving power supply means comprises an air cylinder having a piston connected with the output shaft of said internal combustion engine.

11. A pollution free internal combustion engine, comprising
   a. a crankshaft;
   b. internal combustion piston motor means for driving said crankshaft, said piston motor means being operable in a fuel-rich mode to produce an exhaust gas rich in hydrocarbons and carbon monoxide and low in oxides of nitrogen;
   c. combustion means for establishing a flame to effect substantially complete combustion of said exhaust gas, thereby to convert the hydrocarbons and the carbon monoxide to water and carbon dioxide; and
   d. energy conversion means for converting the heat energy of the flame to mechanical energy and for utilizing this mechanical energy to drive said crankshaft.

12. Apparatus as defined in claim 11, wherein said combustion means establish a flame having a temperature of between about 2500° Rankine and 3300° Rankine, thereby to avoid the formation of oxides of nitrogen.

13. Apparatus as defined in claim 12, wherein said energy conversion means includes an air compression and expansion system including
   a. an air piston motor connected with said crankshaft, said air piston motor having a working chamber;
   b. energy storage means having a storage chamber;
   c. heat exchanger means arranged for heating by said flame;
   d. means operable upon a compression stroke of said air piston for supplying compressed air from said working chamber to said storage chamber; and
   e. means including said heat exchanger means operable during the expansion stroke of said air piston for heating and returning the compressed gas from said storage chamber to said working chamber.

14. Air motor means for supplying power to a rotary output shaft of an engine, comprising
   a. an air cylinder;
   b. an air piston mounted for reciprocation within said air cylinder and defining therein a working chamber, said air piston having compression and expansion strokes relative to said air cylinder and being adapted for connection with said output shaft;
   c. means including an inlet valve for supplying air to said working chamber during an expansion stroke of said air piston;
   d. means including an exhaust valve for exhausting air from said air cylinder during a compression stroke of said air piston;
   e. means defining a combustion chamber;
   f. means including a burner for establishing a flame in said combustion chamber;
   g. energy storage means defining a storage chamber;
   h. first conduit means operable during a compression stroke of said air piston for supplying compressed air from said air cylinder working chamber to said storage chamber; and
   i. means including heat exchanger means arranged for heating by the flame of said burner for supplying the compressed air in said storage chamber to said air cylinder working chamber during an expansion stroke of said air piston, whereby the heat energy of said flame is applied as mechanical energy through said air piston during said expansion stroke.

15. Apparatus as defined in claim 14, wherein said energy storage means comprises an auxiliary piston mounted for reciprocation within said storage chamber, thereby to define within said storage chamber on the side of said auxiliary piston remote from said storage chamber a pressure chamber, said auxiliary piston being operable between first and second positions in which the volume of said storage chamber is a minimum and a maximum, respectively, and means normally biasing said auxiliary piston toward said first position, the magnitude of biasing force of said biasing means being such as to maintain said auxiliary piston in said first position during the initial stages of the compression stroke of said piston, and to permit said auxiliary piston to be displaced to its second position by the force of the compressed air in said working chamber near the end of said compression stroke;

and further wherein said heat exchanger means is connected in series in said first conduit means, whereby air compressed in said air cylinder flows from said air cylinder to said storage chamber via said heat exchanger means during the compression stroke of said air piston, and compressed air stored in said storage chamber flows through said heat exchanger means to said air cylinder during the expansion stroke of said air piston.

16. Apparatus as defined in claim 15, wherein said biasing means comprises biasing valve means for supplying compressed air from said air cylinder to said pressure chamber during a compression stroke of said air piston.

17. Apparatus as defined in claim 16, wherein said biasing valve means comprises a check valve.

18. Apparatus as defined in claim 14, wherein said energy storage means comprises an auxiliary housing defining a constant volume storage chamber;

wherein said means for supplying compressed air from said storage chamber to said working chamber comprises second conduit means in which said heat exchanger means is directly connected; and further including by-pass valve means for closing said first conduit means during the expansion stroke of said air piston.

19. Apparatus as defined in claim 18, and further including flow control means operable during the compression stroke of said air piston for causing a greater quantity of air to flow from said working chamber to said storage chamber through said first conduit means than through said second conduit means and said heat exchanger means.

20. Apparatus as defined in claim 19, wherein said flow control means is operable only during the terminal period of the compression stroke of said air piston.

21. Apparatus as defined in claim 20, wherein said flow control valve means comprises stub valve means connected between said air piston and the end wall of the air cylinder that is adjacent the piston when said piston is at the end of its compression stroke.

22. Apparatus as defined in claim 19, wherein said flow control means comprises a portion of said second conduit means having a cross section that is restricted relative to said first conduit means.

23. Apparatus as defined in claim 18, wherein said by-pass valve means comprises a check valve.

24. Apparatus as defined in claim 18, wherein said auxiliary housing is remote from said air cylinder.

25. Apparatus as defined in claim 18, wherein said air cylinder has an end wall defining a portion of said working cylinder; and further wherein said auxiliary cylinder is mounted on said air cylinder end wall on the side thereof remote from said working chamber, said end wall containing a port defining said first conduit means.

26. Apparatus as defined in claim 25, wherein said by-pass valve means comprises normally open check valve means arranged to close said port when the pressure differential between said storage and working chambers exceeds a given value.

27. Apparatus as defined in claim 26, wherein said inlet and exhaust valve means are each mounted in wall portions of said auxiliary housing.

28. Apparatus as defined in claim 27, wherein said second conduit means is connected at one end with a port contained in a wall portion of said auxiliary housing.

29. Apparatus as defined in claim 28, wherein said second conduit means includes at its other end an end portion that extends across said energy storage chamber and through an opening contained in said air cylinder end wall, said end portion terminating in communication with said working chamber.

30. Apparatus as defined in claim 14, wherein said flame establishing means includes third conduit means connecting said exhaust valve with said burner for mixing with the combustible fuel compressed air from said air cylinder in such a fuel-to-air ratio as to establish a fuel-lean flame, whereby the exhaust gas from said flame is low in the production of hydrocarbons, carbon monoxide, oxides of nitrogen, and other pollutants.

31. Apparatus as defined in claim 30, and further including surge tank means connected in said third conduit means for supplying compressed air to said burner during the periods said exhaust valve is closed.

32. Apparatus as defined in claim 31, wherein said surge tank means comprises a housing member containing a surge chamber means for introducing combustible fuel into one end of said surge chamber and an air supply pipe connected with said third conduit means for supplying air into the other end of said surge chamber, the volume of said surge chamber being such as to accommodate at burner pressure the air delivered on an exhaust stroke of said air piston.

33. Apparatus as defined in claim 14, wherein said heat exchanger means comprises a stack of spaced planar elements longitudinally spaced from, and arranged generally parallel with the axis of, said burner means, means for effecting flow of the flame exhaust gases through first spaces between some of said planar elements, and means for effecting flow of the compressed air from said storage chamber to said working chamber via second spaces between others of said planar elements.

34. Apparatus as defined in claim 14, wherein said heat exchanger means is generally annular and is arranged concentrically in spaced relation about said burner.

35. Apparatus as defined in claim 34, wherein said annular heat exchanger means contains longitudinal passages for the flow of the flame exhaust gases therethrough, and further wherein said combustion chamber includes means for reversing the flow of the flame combustion gases radially outwardly and reversely backwardly through the heat exchanger longitudinal passages.

36. Apparatus as defined in claim 35, and further including helical guide vane means on at least one wall surface of the heat exchanger longitudinal passages for causing a minimum Reynolds number to be exceeded and thereby effect turbulent flow of said combustion gases through said heat exchanger, whereby the transfer of heat to said compressed air is enhanced.

37. Apparatus as defined in claim 36, wherein said annular heat exchanger means includes generally annular passages through which compressed air is conducted from said storage chamber to said working chamber.

38. Apparatus as defined in claim 30, wherein said flame establishing means further includes a plurality of internal combustion piston-cylinder motors operable in a fuel-rich mode, whereby the exhaust gas from said internal combustion motors is rich in hydrocarbons and carbon monoxide, but low in oxides of nitrogen, the pistons of said internal combustion motors and the air piston being adapted for driving connection with said output shaft, whereby upon complete combustion of said fuel-rich exhaust gases in said combustion chamber, the resultant combustion chamber exhaust gases are substantially free of pollutants.

* * * * *